United States Patent
Erhardt

(10) Patent No.: US 8,171,073 B2
(45) Date of Patent: May 1, 2012

(54) COMPUTER SYSTEM CONNECTED TO A DATA COMMUNICATIONS NETWORK

(75) Inventor: Eduard Erhardt, Vaihingen (DE)

(73) Assignee: Siemens Aktiengesellschsft, Munich (DE)

( * ) Notice: Subject to any disclaimer, the term of this patent is extended or adjusted under 35 U.S.C. 154(b) by 1132 days.

(21) Appl. No.: 10/600,643

(22) Filed: Jun. 23, 2003

(65) Prior Publication Data

US 2004/0059948 A1    Mar. 25, 2004

Related U.S. Application Data

(63) Continuation of application No. PCT/DE01/04820, filed on Dec. 20, 2001.

(30) Foreign Application Priority Data

Dec. 22, 2000  (DE) ................................ 100 64 658

(51) Int. Cl.
  *G06F 15/16* (2006.01)
(52) U.S. Cl. ...................................... 709/202
(58) Field of Classification Search ............ 726/24; 707/202; 709/201–203, 217–219
  See application file for complete search history.

(56) References Cited

U.S. PATENT DOCUMENTS

| | | | |
|---|---|---|---|
| 5,799,323 A * | 8/1998 | Mosher et al. | 707/202 |
| 6,061,794 A | 5/2000 | Angelo et al. | |
| 6,253,334 B1 | 6/2001 | Amdahl et al. | |
| 6,480,962 B1 * | 11/2002 | Touboul | 726/22 |
| 6,484,109 B1 * | 11/2002 | Lofall | 702/56 |
| 6,526,418 B1 * | 2/2003 | Midgley et al. | 707/204 |
| 6,549,921 B1 * | 4/2003 | Ofek | 707/204 |
| 6,567,869 B2 * | 5/2003 | Shirley | 710/62 |
| 6,901,519 B1 * | 5/2005 | Stewart et al. | 726/24 |
| 7,093,135 B1 * | 8/2006 | Radatti et al. | 713/188 |

FOREIGN PATENT DOCUMENTS

| | | |
|---|---|---|
| DE | 39 11 407 A1 | 10/1990 |
| DE | 200 14 381 U1 | 1/2001 |
| JP | 04257931 A | 9/1992 |
| WO | WO 00/36515 A1 | 6/2000 |

* cited by examiner

*Primary Examiner* — Chirag R Patel
(74) *Attorney, Agent, or Firm* — Staas & Halsey LLP

(57) ABSTRACT

A computer system connected to a data communications network, wherein the computer system is reliably protected against computer viruses, unauthorized access to internal data, and loss of data in the event of infection with computer viruses. The computer system has a first computer (1) and a second computer (2) that is independent of and redundant to the first computer. The two computers match themselves by comparing their work results. The receipt of data from the data communications network (6) is limited to the first computer, and the transmission of data to the data communications network is limited to the second computer. At least the initial processing of received data is limited to the first computer, and non-verified or non-verifiable data received by the first computer are stored in the second computer only in locked form, i.e., in non-processable form.

25 Claims, 1 Drawing Sheet

1 - First Computer
2 - Second Computer
3 - Third Computer
4 - Receiver Driver
5 - Transmitter Driver
6 - Data Communications Network
7 - Keyboard
8 - Mouse
9 - Memory
10 - Memory
11 - Memory
12 - Memory
13 - Memory
14 - Memory
15 - Central Data Memory

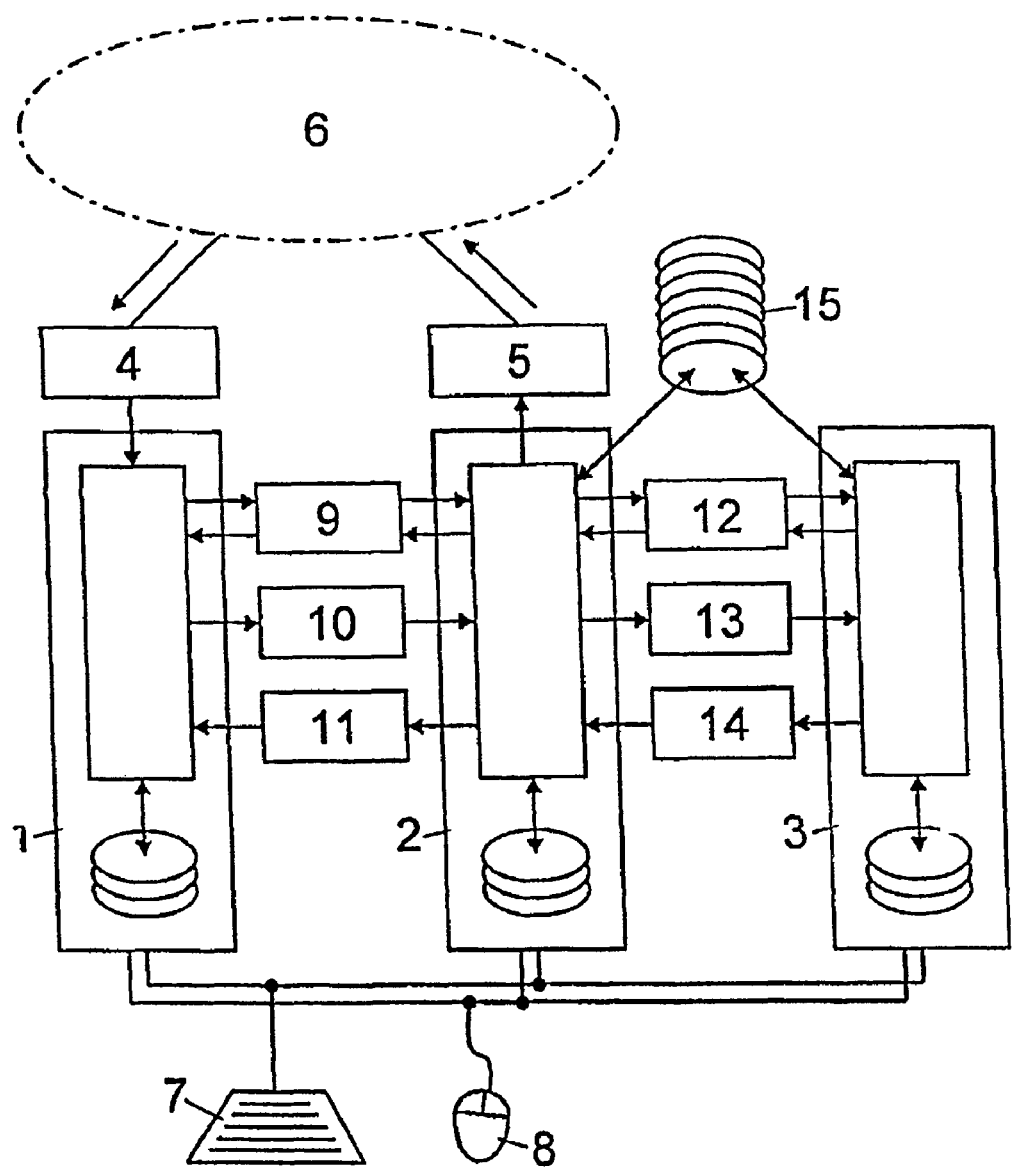
1 - First Computer
2 - Second Computer
3 - Third Computer
4 - Receiver Driver
5 - Transmitter Driver
6 - Data Communications Network
7 - Keyboard
8 - Mouse
9 - Memory
10 - Memory
11 - Memory
12 - Memory
13 - Memory
14 - Memory
15 - Central Data Memory

COMPUTER SYSTEM CONNECTED TO A DATA COMMUNICATIONS NETWORK

This is a Continuation of International Application PCT/DE01/04820, with an international filing date of Dec. 20, 2001, which was published under PCT Article 21(2) in German, and the disclosure of which is incorporated into this application by reference.

FIELD OF AND BACKGROUND OF THE INVENTION

The invention relates to a computer system that is connected to a data communications network, e.g., the Internet or an Intranet. Such computer systems, which are typically individual computers, e.g., PCs, are increasingly exposed to computer viruses and unauthorized access to internal data. As a rule, virus scanners can detect and eliminate only known computer viruses but not viruses that are completely new and that have entirely different structures than previously known viruses. In particular, in the case of computers in administrative offices, banks, insurance companies, and in industry (e.g., for operating and monitoring automation systems), which increasingly communicate with other computer systems, e.g., control centers, via public data communications networks, infection with computer viruses can cause enormous damage. For example, programs called Trojan horses can infiltrate the computer masquerading as a benign application, and can secretly spy out internal data and transmit this data to an external location.

OBJECTS OF THE INVENTION

Thus, it is one object of the invention to obtain secure protection against computer viruses, unauthorized access to internal data, and data loss in case of infection with a virus.

SUMMARY OF THE INVENTION

According to one formulation of the invention, this and other objects are attained by a computer system that can be connected to a data communications network, wherein the computer system has a first computer and an independent, redundant second computer. The two computers match themselves by comparing their work results. The receipt of data from the data communications network is limited to the first computer, and the transmission of data to the data communications network is limited to the second computer. At least the initial processing of the received data is limited to the first computer, and data received but not verified or not verifiable by the first computer is stored in the second computer only in locked, i.e., non-processable form.

The computer system, according to one exemplary embodiment of the invention, is composed of two parallel computers, which have practically the same hardware structure and which are configured with the same software. The two computers work in parallel, alternately, or by sharing the work. However, they regularly match themselves by comparing their work results, e.g., by horizontal parity checks, by parallel balance, or by comparing predetermined data. For example, this matching can be triggered by the user; or the matching can be started automatically, e.g., at the end of a program; when files are closed; when data is input or output; or when a memory is accessed. The two computers exchange data or accept offered data only if the work results supplied by the computers match. In the context of this matching, malfunctions or corrupted data can thus be detected based on different work results.

To achieve the required security, receiving data from the data communications network and at least the initial processing of the received data is limited to the first computer, while transmitting data to the data communications network is limited to the second computer. This can be achieved by a hardware or software transmission block or reception block, respectively. Instead of the transmission block, it may also be provided, for example, that only received data can be stored in the first computer, so that it is impossible to transmit any data other than the received data. Within the context of the initial processing of the received data, which is limited to the first computer, the received data can be verified. Therein, the second computer can accept and store only verified data in unlocked, i.e., processable form. In the case of e-mail messages, verifiable data include, for example, the address of the sender, the "subject" text and other partial data that can be completely verified depending on the software product, e.g., text formats (but not macros). Preferably, the data are independently verified in both computers, and are stored in the second computer only after the results have been matched. Unverified or non-verifiable data received by the first computer are accepted by the second computer only in locked (encapsulated), i.e., non-processable form. This is also true for new data, which is generated by processing the received data in the first computer. Such locked data can neither be opened nor processed in the second computer but can only be added as an attachment, e.g., to an e-mail message being sent.

This makes it possible to ensure that the second, redundant computer, which is prevented by hardware or software means from receiving data from the data communications network, remains free from computer viruses. In addition, no computer viruses can be transmitted to the outside world when data is being sent. Nor can data be fetched or corrupted by so-called Trojan horses. If the first computer is infected with computer viruses because of data received from the data communications network, then this infection is immediately detected when the two computers are matched. In this case, the first computer can be restored to a virus-free state by copying the state of the second computer onto the first computer, without any data or previously performed work being lost.

To exclude the possibility that internal data of the computer system contained in a central data memory are corrupted or deleted because of a virus infection of the first computer, which is capable of receiving data, only the second computer has direct access to the internal data. The first computer receives the internal data only upon request via the second computer.

If the required computer capacity is relatively large, an independent redundant third computer may be provided, in which case the second and third computer match one another by comparing their work results. For example, in the case of an automation system, the third computer can assume the automation functions while the first and the second computer are responsible for communication via the data communications network.

BRIEF DESCRIPTION OF THE DRAWINGS

FIG. 1 illustrates a computer system according to an exemplary embodiment of the present invention.

DETAILED DESCRIPTION OF THE PREFERRED EMBODIMENTS

The exemplary computer system, which is depicted in FIG. 1 as a functional block diagram, has a first computer 1, a second, redundant computer 2 and an optional third computer 3. The computers 1, 2 and 3—with the exceptions described below—each have the same hardware structure and are configured with the same software. The computer 1 is connected to a data communications network 6 via a receiver driver 4 and is unable to transmit data. The redundant computer 2 is connected to the data communications network 6 via a transmitter driver 5 and is unable to receive data. The optional third computer 3 is provided in case increased computing capacity is required, e.g., for operating and monitoring automation systems. Except for the initial processing of received data, which is limited to the first computer 1, and the increased computer capacity to be provided by the third computer 3, all the computers 1, 2 and 3 execute the same functions. Any user inputs using, for example, a keyboard 7 or a mouse 8, are supplied in parallel to all three computers 1, 2 and 3.

The work results or processing results of the two computers 1 and 2 are matched in a first memory or memory area 9 by, e.g., a horizontal parity check, parallel balance, etc. Other memories or memory areas 10 and 11 are used for exchanging data associated with the result matching of the two computers 1 and 2. Data are exchanged, or offered data are accepted, only if the work results or processing results of the two computers 1 and 2 match.

Data received by the computer 1 from the data communications network 6, e.g., e-mail messages, are only selectively forwarded to the second computer 2 in the context of the data exchange (e.g., address of sender, "subject" text) and only to the extent that the data can be completely verified (e.g., text formats, but not macros). This verification is performed independently in the two computers 1 and 2. The data are transmitted and stored in the respectively other computer only if the verification results match. Therein, the initial processing of received data is limited solely to the first computer 1. Non-verifiable received data and new data, which are generated by processing the non-verifiable data in the computer 1, are transmitted only in locked or sealed form to the second, redundant computer 2 in the context of the data exchange. The second, redundant computer 2 can neither open nor process the locked or sealed data. These data can only be added in their locked or sealed form as an attachment to other data being sent, e.g., an e-mail message being sent.

If the first computer 1 is infected with computer viruses because of received data, this infection is detected during the regular matching of the two computers 1 and 2. Because of the above-described security mechanisms in the data exchange between the two computers 1 and 2, the computer viruses cannot spread from the first computer 1 to the second computer 2. By copying the state of the second computer 2 to the first computer 1, the first computer 1 can be restored to its virus-free state without any loss of data. Moreover, the above-described security mechanisms preclude unauthorized access to internal data of the computer system via the data communications network 6.

As mentioned above, larger computer capacities, if needed, are accomplished, for instance, by the optional third computer 3. In this case, the first computer 1 and the second computer 2 are responsible for communication via the data communications network 6. The third computer 3 matches with the second computer 2 via memories or memory areas 12, 13 and 14. For security reasons, the first computer 1 has no access to a central data memory 15 having common data. The common data can be read preferably only by the computer 3 and, if necessary, the computer 2, and are made available to the first computer 1, if required or requested.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A computer system connected to a data communications network, said system comprising:
    a first computer;
    a redundant second computer that is independent of the first computer;
    a computer-to-computer connection between the first computer and the redundant second computer enabling the first computer to match with the redundant second computer by comparing a first work result of the first computer with a second work result of the redundant second computer; and
    at least one computer-to-network connection to connect both the first and second computers to the data communications network independent from the computer-to-computer connection so that receipt of any data from the data communications network is limited to the first computer and transmission of any data to the data communications network is limited to the redundant second computer; wherein at least an initial processing of the data received from the data communications network is limited to the first computer,
    wherein the first computer is configured to convert, transmit and to store in the redundant second computer non-verified or non-verifiable data received by the first computer only in non-processable form, and a virus is detected on the first computer by a comparison of the first and second work results, where the first computer is restored to a virus-free state by copying a state of the redundant second computer onto the first computer.

2. The computer system as claimed in claim 1, wherein the first computer is configured to verify the received data in the first computer, and wherein the first computer is configured to supply only verified data to the redundant second computer in processable form.

3. The computer system as claimed in claim 1, wherein the first computer and the redundant second computer are configured to independently verify the received data, and wherein only matching verified data are stored in the redundant second computer in processable form.

4. The computer system as claimed in claim 1, further comprising: a central data memory,
    wherein direct access to internal data of the computer system contained in a central data memory is limited to the redundant second computer; and
    wherein the first computer is configured to receive the internal data only upon request via the redundant second computer.

5. The computer system as claimed in claim 1, further comprising: an independent, redundant third computer; and
    wherein the redundant second computer is configured to match with the redundant third computer by comparing the second work result of the redundant second computer with a third work result of the redundant third computer.

6. A method, comprising:
    establishing a computer-to-computer connection between a first computer and a redundant second computer;
    comparing a first work result of the first computer with a second work result of the redundant second computer;

establishing at least one computer-to-network connection between a data communications network and both of the first computer and the redundant second computer, independent from the computer-to-computer connection, so that receipt of any data from the data communications network is limited to the first computer, and transmission of any data to the data communications network is limited to the redundant second computer;

limiting at least an initial processing of data received from the data communications network to the first computer; and transmitting from the first computer to the redundant second computer any non-verified data and non-verifiable data received by the first computer only in non-processable form;

detecting a virus on the first computer based on a comparison result of said comparing of the first and second work results; and restoring the first computer to a virus-free state by copying a state of the redundant second computer onto the first computer.

7. The method of claim 6, further comprising matching the second work result of the redundant second computer with a third work result of a third computer.

8. The computer system as claimed in claim 1, wherein connection between the first computer and the redundant second computer forms an internal network of the computer system and wherein the data communications network is an external network with respect to the computer system.

9. The computer system as claimed in claim 1, wherein the first computer independently verifies the received data producing the first work result and wherein the redundant second computer independently verifies the received data producing the second work result.

10. The computer system as claimed in claim 1, wherein data processed by the first computer produces the first work result and wherein data processed by the redundant second computer produces the second work result.

11. The computer system as claimed in claim 10, wherein the first and second work results are produced by executing at least one of horizontal parity checks and parallel balancing.

12. The computer system as claimed in claim 1, wherein said matching by the first computer with the redundant second computer is performed at an end of a program or when memory is being accessed.

13. The computer system as claimed in claim 1, wherein all of the initial processing is performed by the first computer.

14. The method as claimed in claim 6, wherein connection between the first computer and the redundant second computer forms an internal network of a computer system and wherein the data communications network is an external network with respect to the computer system.

15. The method as claimed in claim 6, wherein the first computer independently verifies received data producing the first work result and wherein the redundant second computer independently verifies the received data producing the second work result.

16. The method as claimed in claim 6, wherein data processed by the first computer produces the first work result and wherein data processed by the redundant second computer produces the second work result.

17. The method as claimed in claim 6, wherein a match by the first computer with the redundant second computer is performed at an end of a program or when memory is being accessed.

18. The method as claimed in claim 6, wherein all of the initial processing is performed by the first computer.

19. The method as claimed in claim 6, further comprising matching the redundant second computer with an independent, redundant third computer by comparing the second work result of the redundant second computer with a third work result of the redundant third computer.

20. The method as claimed in claim 19, wherein only the second and third computers have access to internal data of the computer system and wherein the redundant third computer is configured to implement operation and monitoring of an automation system.

21. The computer system as claimed in claim 5, wherein user inputs are supplied via a keyboard or a mouse in parallel to the first computer, the second redundant computer and the redundant third computer.

22. The method as claimed in claim 19, wherein user inputs are supplied via a keyboard or a mouse in parallel to the first computer, the redundant second computer and the redundant third computer.

23. The method of claim 6, wherein only the redundant second computer directly accesses internal data contained in a central data memory, and wherein the first computer indirectly accesses the internal data only upon request via the redundant second computer.

24. A method, comprising:
establishing a computer-to-computer connection between a first computer and a redundant second computer;

comparing a first work result of the first computer with a second work result of the redundant second computer;

establishing at least one computer-to-network connection between a data communications network and both of the first computer and the redundant second computer, independent from the computer-to-computer connection, so that receipt of any data from the data communications network is limited to the first computer, and transmission of any data to the data communications network is limited to the redundant second computer;

transmitting from the first computer to the redundant second computer any non-verified data and non-verifiable data received by the first computer only in non-processable form;

detecting a virus on the first computer based on a comparison result of said comparing of the first and second work results; and restoring the first computer to a virus-free state by copying a state of the redundant second computer onto the first computer.

25. The method of claim 24, further comprising limiting at least an initial processing of data received from the data communications network to the first computer.

* * * * *